(12) United States Patent
Krishnamurthy

(10) Patent No.: US 6,823,436 B2
(45) Date of Patent: Nov. 23, 2004

(54) SYSTEM FOR CONSERVING METADATA ABOUT DATA SNAPSHOTS

(75) Inventor: Vikram Harakere Krishnamurthy, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 189 days.

(21) Appl. No.: 09/970,054

(22) Filed: Oct. 2, 2001

(65) Prior Publication Data

US 2003/0065901 A1 Apr. 3, 2003

(51) Int. Cl.⁷ .............................................. G06F 13/00
(52) U.S. Cl. ...................... 711/170; 711/154; 711/156; 711/162
(58) Field of Search ................... 711/170, 162, 711/156, 154

(56) References Cited

U.S. PATENT DOCUMENTS

| | | |
|---|---|---|
| 5,790,773 A | 8/1998 | DeKoning et al. |
| 5,884,307 A | 3/1999 | Depledge et al. |
| 6,038,639 A | 3/2000 | O'Brien et al. |
| 6,058,054 A | 5/2000 | Islam et al. |
| 6,061,770 A | 5/2000 | Franklin |
| 6,119,208 A | 9/2000 | White et al. |
| 6,131,148 A | 10/2000 | West et al. |
| 6,141,656 A | 10/2000 | Ozbutun et al. |
| 6,182,198 B1 | 1/2001 | Hubis et al. |
| 6,189,079 B1 * | 2/2001 | Micka et al. ............... 711/162 |
| 6,195,656 B1 | 2/2001 | Ozbutun et al. |
| 6,205,442 B1 | 3/2001 | Cohen et al. |
| 6,209,070 B1 * | 3/2001 | Reed et al. ................. 711/165 |
| 6,212,531 B1 | 4/2001 | Blea et al. |
| 6,510,500 B2 * | 1/2003 | Sarkar ........................ 711/162 |

\* cited by examiner

Primary Examiner—Reba I. Elmore
(74) Attorney, Agent, or Firm—Dillon & Yudell, LLP

(57) ABSTRACT

A data processing system and method manage usage metadata nodes about data snapshots of data write operations among storage volumes of the system while conserving metadata nodes. Metadata sublogging is achieved by dividing metadata segments into subsegments and tracking them by use of a bitmap.

12 Claims, 6 Drawing Sheets

*FIG. 6*

| STORAGE SEGMENTS | | | | | | | | | | | | | | | |
|---|---|---|---|---|---|---|---|---|---|---|---|---|---|---|---|
| INDX | SS0 | SS1 | SS2 | SS3 | | | | | | | | | | | SSX |
| 0 | • | • | • | • | • | • | • | • | • | • | • | • | • | • | 0 |
| 1 | • | • | • | • | • | • | • | • | • | • | • | • | • | • | 1 |
| 2 | • | • | • | • | • | • | • | • | • | • | • | • | • | • | • |
| 3 | | | | | | | | | | | | | | | |
| 4 | | | | | | | | | | | | | | | |
| • | | | | | | | | | | | | | | | |
| • | | | | | | | | | | | | | | | |
| • | | | | | | | | | | | | | | | |
| • | | | | | | | | | | | | | | | |
| • | | | | | | | | | | | | | | | |
| • | | | | | | | | | | | | | | | |
| M | | | | | | | | | | | | | | | |

SYSTEM FOR CONSERVING METADATA ABOUT DATA SNAPSHOTS

BACKGROUND OF THE INVENTION

1. Technical Field

The present invention relates in general to data processing systems and more particularly to better utilization of memory resources and of segment metadata nodes in data snapshots in such systems.

2. Description of the Related Art

A snapshot of data in a data processing system at a time "t" creates, in a target data volume, a logical copy of data in a source data volume. Physical copying of the data from the source volume to the target volume can then subsequently take place, with any intervening changes ("writes") to data in the source volume being momentarily delayed. During this momentary delay, the original version of the data sought to be changed is preferentially copied from the source volume to the target volume, prior to writing the change. Thus, the snapshot of data in the target volume represents the exact state of the data in the source volume at the time "t."

Snapshots as defined above are useful for backing up data and for testing. For example, taking a snapshot of frequently changing data facilitates the execution of test applications against the snapshot of the data, without changes to the data unduly interfering with the test application execution. Moreover, the snapshot mechanism facilitates faster data backups by a storage subsystem as compared to file system-based backups, which entail host CPU processing and which require the allocation of relatively high network bandwidth.

Existing snapshot systems are, however, unduly restrictive. Most, for instance, permit write access only to the source volume in order to coordinate data in the system. Further, the limitations of existing snapshot systems prohibit the undertaking of concurrent snapshots or of distributed snapshots, and they do not support cyclical and transitive snapshot operations. Concurrent snapshots, distributed snapshots, and cyclical and transitive snapshot operations can be very useful for test purposes. Moreover, existing systems fail to account for the above-recognized considerations. In view of this, the costs of reads and writes are not optimized in existing snapshot systems in the case of multiple storage volumes that are involved in multiple concurrent snapshot operations.

A typical data snapshot management system needs to record persistently (as long as the snapshot relationship between source and target data volumes is active) the metadata segments that carry information about where to get the $t_0$ data from. In practical systems where this is implemented, the metadata segments consume large amounts of a valuable resource, either non-volatile random access memory (or NVRAM) space, or storage on drives. This imposes a limitation on how much of such metadata segments can be maintained through the backup creation. Owing to this limitation, a snapshot system cannot handle a specific pattern of writes that consumes a large or unlimited number of metadata segments.

An example system where the above-identified problems may be encountered occurs in systems where the source and target volumes are made available through most of the backup operation. These systems are described, for example, in a co-pending, commonly owned U.S. patent application: "System and Method for Concurrent Distributed Snapshot Management", Ser. No. 09/376,832, filed Aug. 18, 1999, (filed as IBM Case No. AM9-99-052).

In data processing systems, certain system interfaces permit techniques which allow the formation in memory of what are known as sparse files. Files are created having lengths greater than the data they actually contain, leaving empty spaces for future addition of data. Data is written in relatively small portions into a number of memory locations which are not contiguous. Certain portions of the computer memory in the area of these memory locations, however, never have data written in them, although other memory files receive data. Data written into sparse files is known as sparse data. Snapshot systems when sparse data is present have been a problem, in that they rapidly consume large numbers of metadata segments and memory resources.

It would be desirable to have an ability to have continuing records available about metadata segments in data processing systems while not consuming memory resources of the data processing system.

SUMMARY OF THE INVENTION

It is an object of the present invention to provide a data processing system and method of maintaining usage data about data snapshots of data write operations to storage media of the data processing system and keep record of data overwrites without unduly consuming memory resources of the data processing system.

It is a further object of the present invention to provide a computer program product enabling a data processing system to maintain usage data about data snapshots of data write operations to storage media of the data processing system and keep record of data overwrites without unduly consuming memory resources of the data processing system.

It is still a further object of the present invention to provide a memory product stored in a memory of a data processing system to better utilize memory resources of the data processing system, particularly those relating to usage metadata nodes.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

FIG. 6 is a schematic representation of a bitmap according to the present invention and used during the process of FIG. 5.

DETAILED DESCRIPTION OF THE PREFERRED EMBODIMENT

Figure 1:
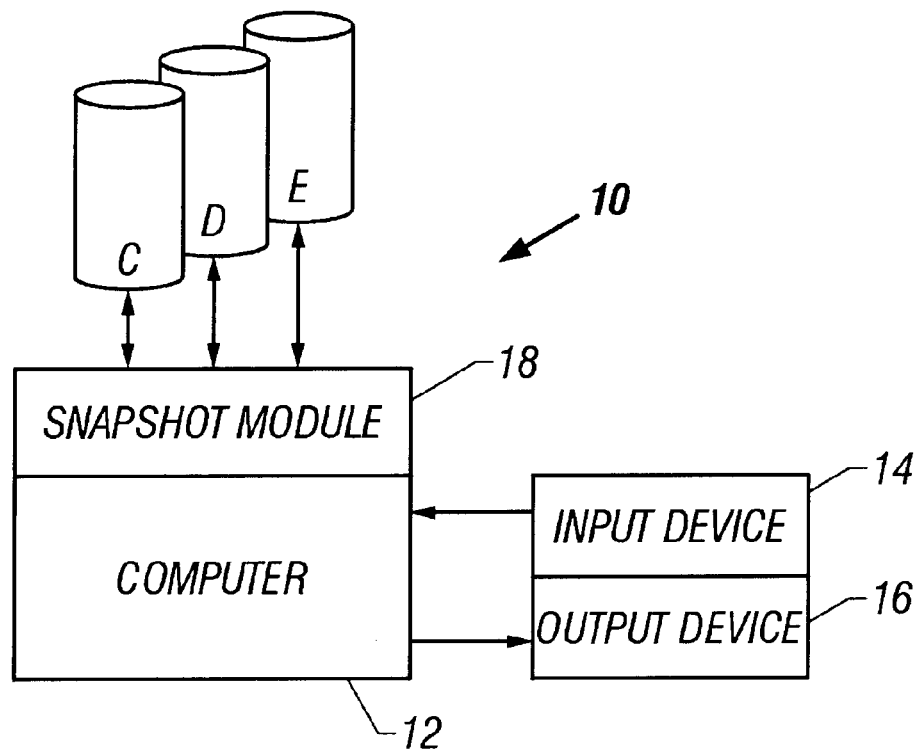
FIG. 1 is a block diagram of the architecture of a data processing system according to the present invention.

Referring initially to FIG. 1, a system is shown, designated 10, for invoking and executing transitive distributed snapshot relationships between plural data storage volumes C, D, and E, such that a read or write can be made to any storage volume. As shown, the system 10 can include a computer 12 including a respective input device 14 such as a keyboard with, e.g., a point and click device, and an output device 16, such as a monitor, printer, other computer, or computer network. Also, the computer 12 accesses a software-implemented snapshot module 18 for undertaking the inventive steps of the process according to the present invention described herein.

The computer 12 can be a personal computer made by International Business Machines (IBM) of Armonk, N.Y. Other digital processors, however, may be used, such as a laptop computer, mainframe computer, palmtop computer, personal assistant, or any other suitable processing apparatus. Likewise, other input devices, including keypads, trackballs, and voice recognition devices can be used, as can other output devices, such as data storage devices.

Figure 2:
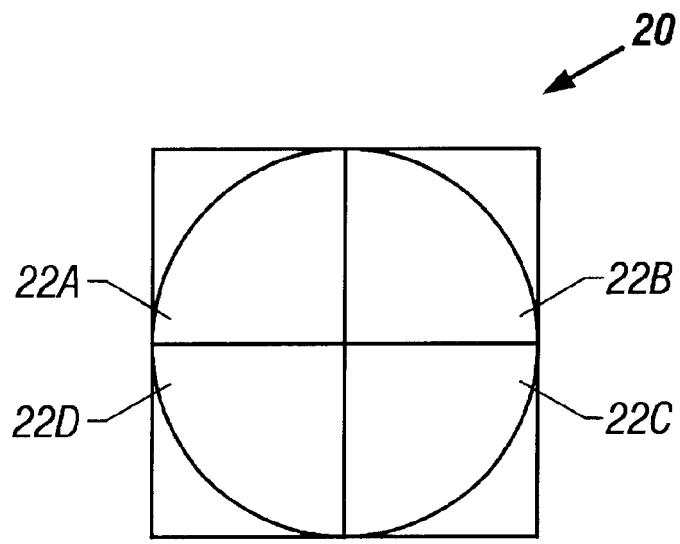
FIG. 2 is a schematic diagram of a computer program product.

In any case, the processor of the computer 12 accesses the snapshot module 18 to undertake the logic of the present invention, which may be executed by a processor as a series of computer-executable instructions. The instructions may be contained on a data storage device with a computer readable medium, such as a computer diskette 20 shown in FIG. 2 having a computer usable medium 22 with code elements 22A, 22B, 22C and 22D stored thereon. Or, the instructions may be stored on random access memory (RAM) of the computer 12, on a DASD array, or on magnetic tape, conventional hard disk drive, electronic read-only memory, optical storage device, or other appropriate data storage device. In an illustrative embodiment of the invention, the computer-executable instructions may be lines of C++ code.

Indeed, the flow charts herein illustrate the structure of the logic of the present invention as embodied in computer program software. Those skilled in the art will appreciate that the flow charts illustrate the structures of computer program code elements including logic circuits on an integrated circuit, that function according to this invention. Manifestly, the invention is practiced in its essential embodiment by a machine component that renders the program code elements in a form that instructs a digital processing apparatus (that is, a computer) to perform a sequence of function steps corresponding to those shown.

Co-pending, commonly owned U.S. patent application: "System and Method for Concurrent Distributed Snapshot Management." Ser. No. 09/376,832, filed Aug. 18, 1999, (filed as IBM Case No. AM9-99-052), which is incorporated herein by reference, provides a system and method for managing data snapshots among storage volumes in a data processing system such as that shown in FIG. 1. The present invention provides an ability to have continuing records available about metadata segments in data processing systems of this type while not unduly consuming memory resources of the data processing system.

Figure 3:
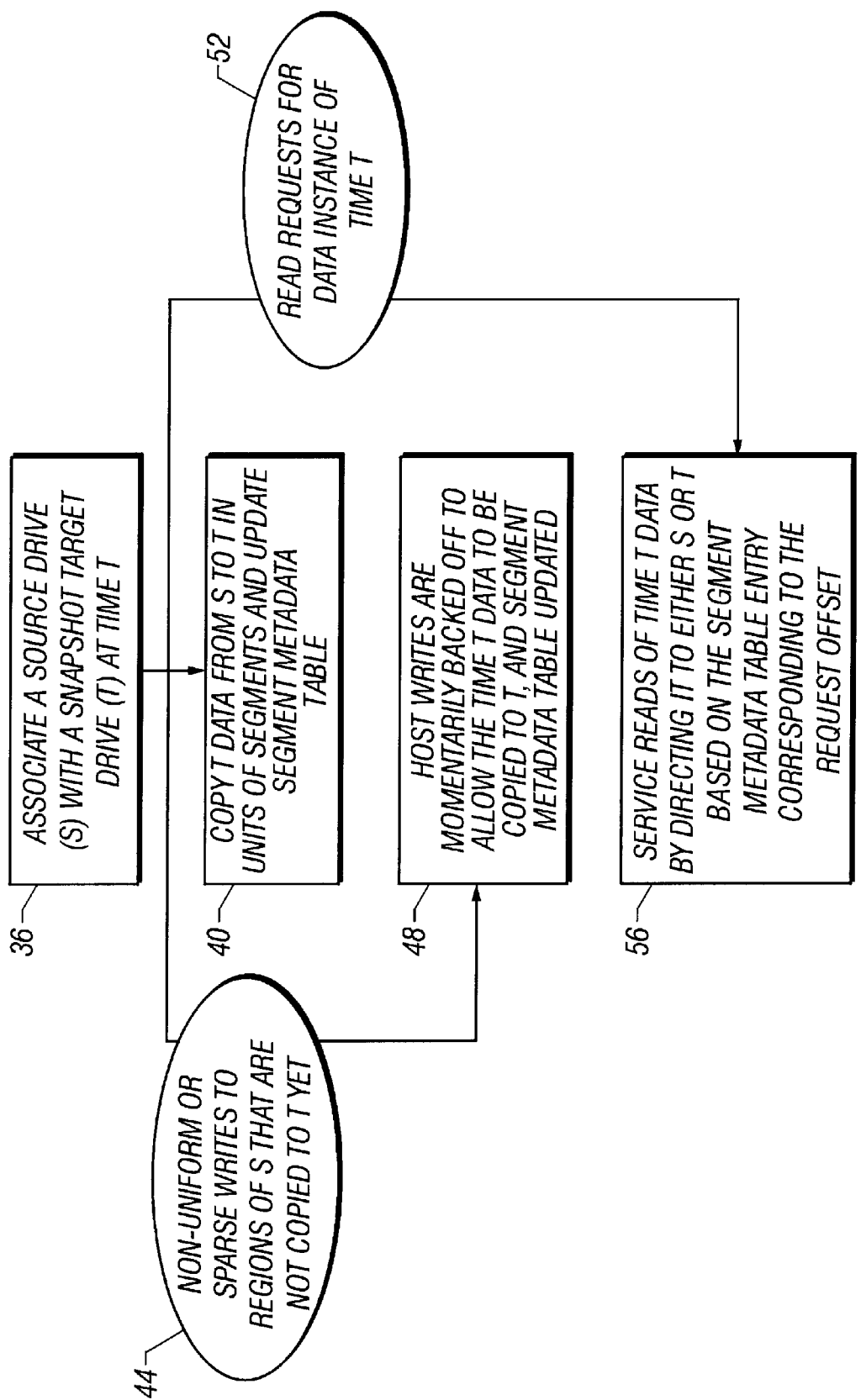
FIG. 3 is a flow chart of a typical snapshot management process in a data processing system like that of FIG. 1.

FIG. 3 represents a flow diagram of logic in the data processing 10 for forming metadata nodes according to techniques of the above-referenced co-pending, commonly owned U.S. patent application Ser. No. 09/376,832. Block 36 represents the association at a time $t_0$ of a source drive in any one of the data volumes C, D or E with a snapshot target drive in one of the same data volumes. Block 40 represents the copying of the time $t_0$ data from the source drive to the target drive in units of segments. Also, during block 40 the snapshot module 18 updates in memory in the computer system 10 to form segment metadata nodes as represented in FIGS. 4A and 4B, as will be described below.

At times, as indicated at 44 in FIG. 3, non-uniform or sparse write operations are made to regions of the source drive that are not yet copied to the target drive. In such an event, as indicated at 48, the host write operations are momentarily backed off or delayed. This is done to allow the time $t_0$ data formed during block 40 to be copied to the target drive, at which time a segment metadata table in memory is updated, as shown in the previously identified co-pending, commonly owned U.S. patent application Ser. No. 09/376,832. Also, as indicated at 52, at times read requests for data which were the subject of processing according to block 40 may be made. In that case, as block 56 indicates, the read requests of the time $t_0$ data are serviced. This is done by directing the read operation to either the source drive or the target drive based on the segment metadata table entry corresponding to the offset which is the subject of the read request.

Figure 4A:
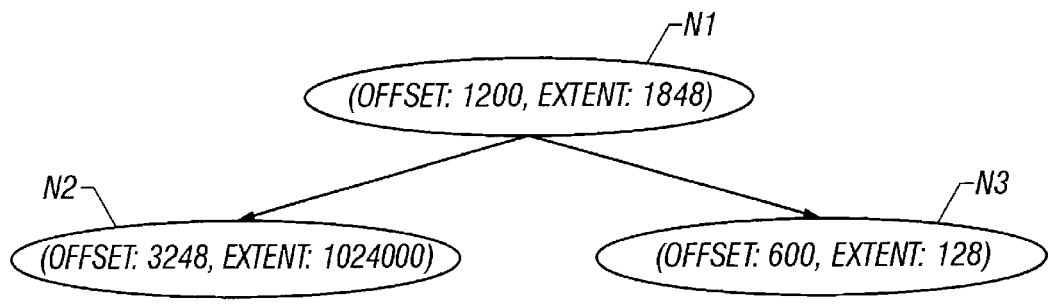
FIGS. 4A and 4B are schematic representations of topology of a metadata log formed using the techniques of FIG. 3.
Figure 4B:
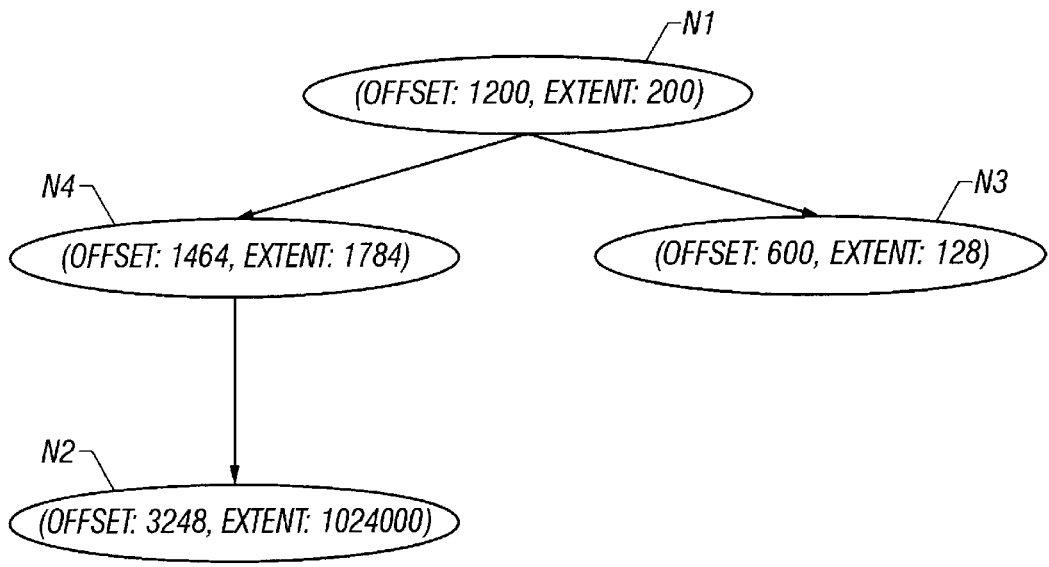

FIG. 4A illustrates the topology of a conventional relationship between metadata nodes and subsequent logs formed by the snapshot module 18 in NVRAM, flash memory, disk blocks, micro drives or other kinds of non-volatile stable storage media available or present as memory of the data processing system 10. The topology of an example metadata log of nodes N1, N2 and N3 is shown in the conventional manner of depicting metadata nodes. The metadata tree of FIG. 4A represents a data snapshot relationship in its early stage, when not much data has been copied over from the source drive to the target as part of the snapshot copy, nor have the source drive contents changed much since time $t_0$, the time at which the data snapshot was established. Thus, much of the $t_0$ data is still available at the source drive. The only portions of the data that have been copied over are:

Offset 0, Extent 600,

Offset 728, Extent 472,

Offset 3048, Extent 200.

Node N1 represents metadata about a storage area having an offset in disk space of 1200 data blocks and an extent of 1848 data blocks which has not yet been overwritten. Node N2 represents metadata about a storage area having an offset in disk space of 3248 data blocks and an extent of 1,024,000 data blocks which is not yet subject to an overwrite, indicative of large areas which have not been overwritten during early stages. Further, node N3 represents metadata about a storage area having an offset of 600 data blocks and an extent of 128 data blocks which have not yet been copied over.

FIG. 4B represents the topology of metadata nodes of FIG. 4A as modified by a write operation to the source drive at an offset of 1400, with an extent of 64 data blocks. The node N1 at an offset of 1200 now has an extent of 200 data blocks. As can be seen, logging portions of time $t_0$ data not copied over, a new node as indicated at N4 must be formed, having an offset of 1464 and an extent of 1784 data blocks.

Subsequent write operations of sparse data to the source drive increase the number of nodes correspondingly and consume considerable NVRAM or other memory storage in the data processing system 10.

Figure 5:
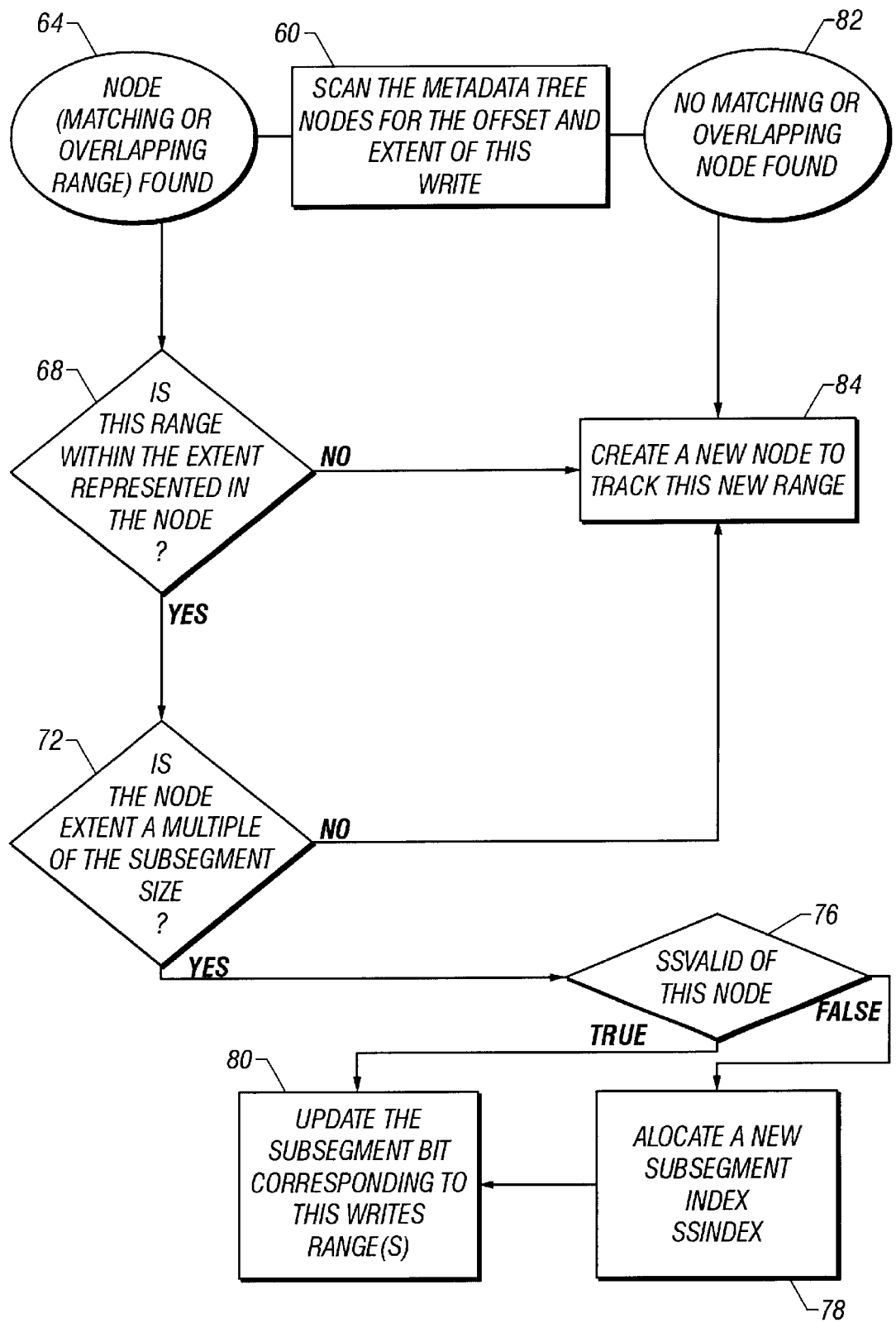
FIG. 5 is a flow chart of a process of updating segment metadata according to the present invention.

FIG. 5 of the drawings is a flow diagram illustrating a process according to the present invention for updating a metadata segment table. The process of FIG. 5 is implemented as a further procedure to the procedure of block 40 performed by snapshot module 18. The metadata nodes used in connection with the process of FIG. 5 have two additional bit fields or storage locations.

A first location SSValid (FIGS. 7 and 8) is one indicating whether a data write operation is to an area of storage volume in the data processing system 10 which has been the subject of an earlier data write operation. A TRUE indicator designates that at least a portion of the storage volume is the subject of an earlier data write, and a FALSE indicator represents the opposite.

A second location in the metadata nodes used in the process of FIG. 5 is SSIndex (FIG. 8), used to designate which entry in a bitmap B contains indicators of those portions of storage volume in the data processing system 10 which contain data present as a result of overwrites. The storage areas indicated may overlap fully or partially areas of earlier data as a result of overwrites, or an exact match of offset and extent may occur.

Figure 7:
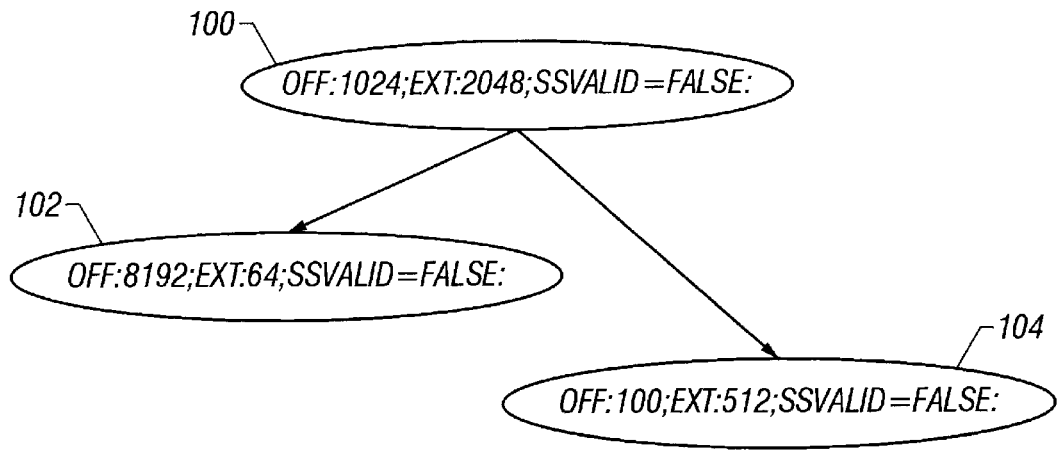
FIG. 7 is a schematic representation of topology of a metadata log formed using the techniques of FIG. 5.
Figure 8:
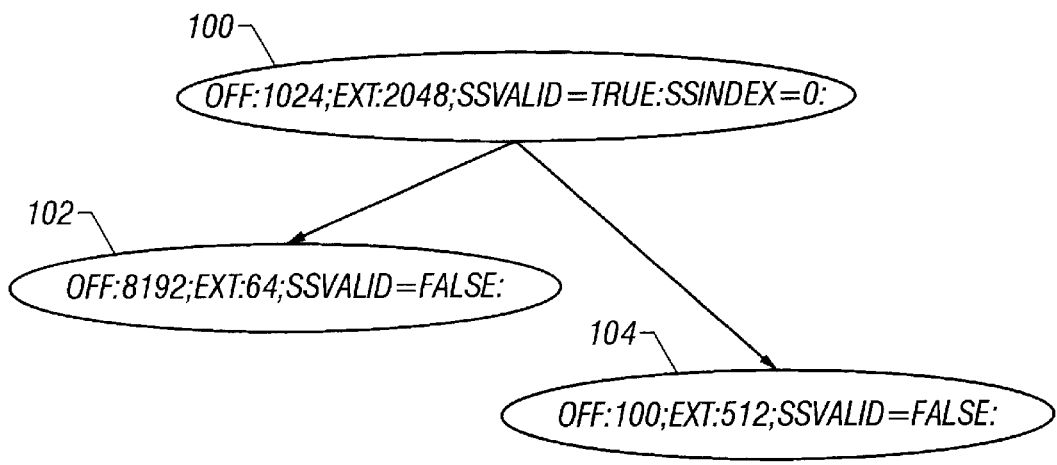
FIG. 8 is a schematic representation of the topology of FIG. 7 after a data overwite has been performed on portions of the data indicated by the metadata log represented therein.

During block 60 of the process of FIG. 5, metadata tree nodes like those of FIGS. 7 and 8 are scanned for the offset and extent of a requested write operation. If a node is found with a matching or overlapping range, as indicated at 64, a decision is made as indicated at 68. The decision made as indicated at 68 is whether or not the range of the requested write operation is within the extent represented within the node located during the procedure of block 64.

If this is found to be the case, a decision is then made as indicated at 72 whether the node extent is a multiple of the subsegment size. If an affirmative result is indicated, an inquiry is made, as indicated at 76, of the status of the SSValid indicator (FIGS. 7&8) in the metadata node. If the result is an affirmative, the SSIndex portion of the metadata node is updated, as indicated at 80, to identify the index I in the bitmap B identifying the portions of the memory storage volume which are overlapped at least in part as a result of the requested write operation. When the result of block 76 indicates that the subsegment log is not valid for that node, a block 78 performed by the snapshot module 18 causes a new subsegment index to be formed in the subsegment log or bitmap B.

If the scan operation of block 60, however, finds no matching or overlapping node, a block 84 causes the snapshot module 18 to form a new metadata node to track the new range indicated by the offset and extent of the write operation in block 60. The procedure of block 84 is also performed if the result of decision 68 is a negative, or if the result of decision 72 is a negative.

Figure 6:
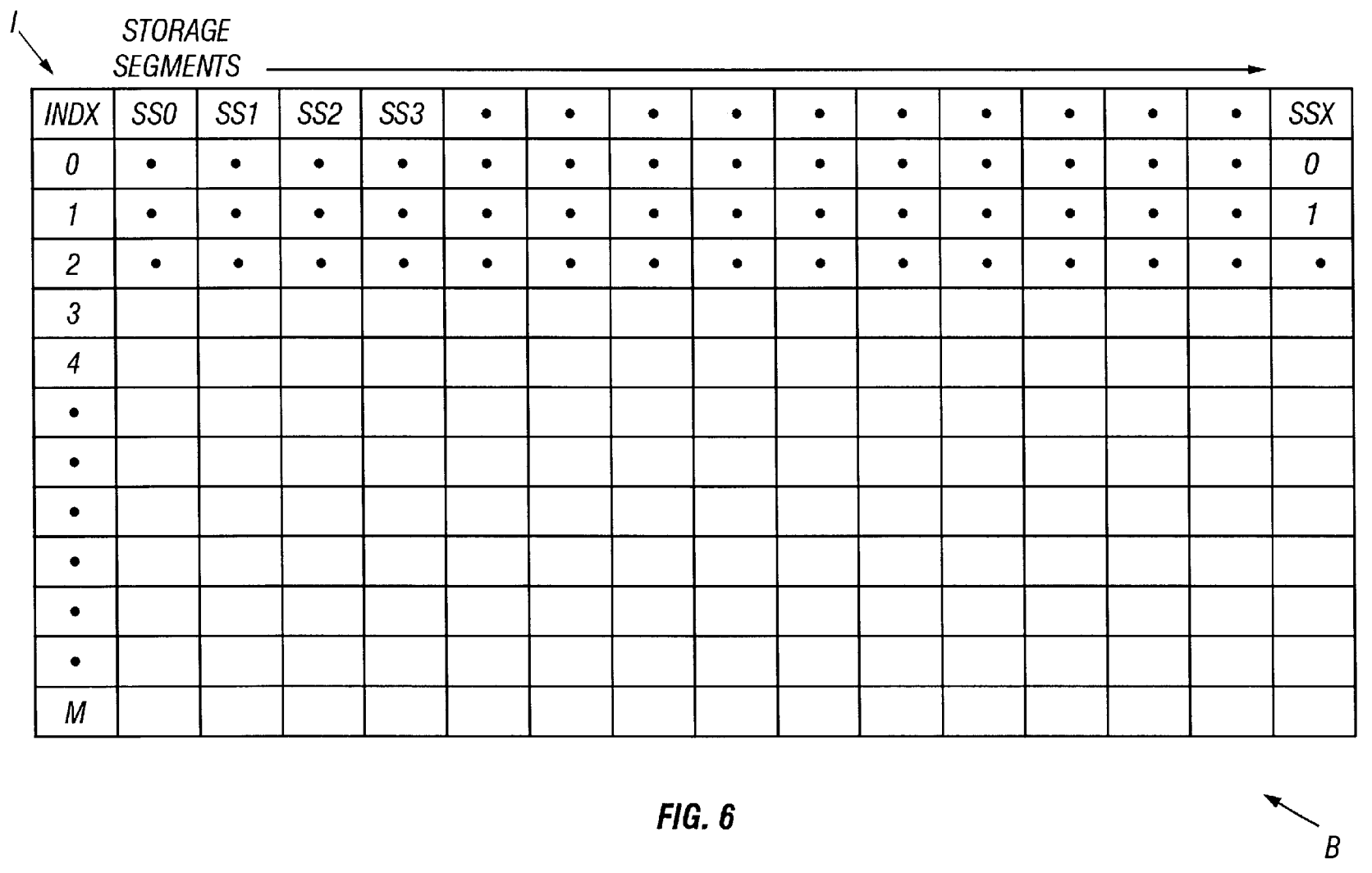

FIG. 6 of the drawings represents a schematic diagram of the subsegment log or bitmap B according to the present invention formed in VRAM or other memory storage of the data processing system 10. The storage capacity of storage volumes C, D and E in the data processing system 10 is partitioned into x blocks or storage segments, each of an assigned size of data storage units, typically some binary multiple such as 64, 128, 256 or higher.

The relationship between the subsegment size and the extent of the metadata node can be expressed as:

$$SS\_Size = Metadata\_Extent / Bits\_Per\_SSIndex.$$

As an example, for a Metadata_Extent of 1024 blocks and 8 bits per SSIndex, the subsegment size, SS_Size is 128 blocks.

The bitmap B contains across its lateral extent a data space of one bit for an indicator for each of the storage segments which are so mapped. If some or all of the memory 20 in the subsegment represented by that indicator has been overwritten, the indicator at that site in the bitmap B is changed, for example from a 0 to a 1. Until an overwrite occurs, the indicator is unchanged from its original state. The bitmap B has an index I of log entries counting in ascending order from 0 and capable of being up to M in number. As entries are required into the bitmap B during block 78 of the process of FIG. 5, it is assigned the next higher number in sequence which contains no indicators that one of the storage segments 1 through x has been written over in it.

FIG. 7 represents the topology of example metadata nodes configured according to the present invention. It is to be noted that a first node 100 contains an indicator SSValid=False. Such an entry indicates that the bitmap B contains no indicators that one of the storage segments at offset 1024 and having an extent of 2048 data blocks has been overwritten the time $t_0$ of the write operation. Similarly a second node 102 for a write operation at offset 8192 and a third node for a write operation at offset 100 also bear an SSValid=False indicator for the same reason.

As an example, for a metadata node offset of 100 and using 8 bits per SSIndex as mentioned previously, then for a node having metadata as follows:

(Offset100:Extent 1024:SSValid TRUE:SSIndex1) and the contents of SSIndex 1 are as follows:

Bit 0 represents (Offset100:Extent128)
Bit 1 represents (Offset228:Extent128)
Bit 2 represents (Offset356:Extent128)
Bit 3 represents (Offset484:Extent128)
Bit 4 represents (Offset612:Extent128)
Bit 5 represents (Offset740:Extent128)
Bit 6 represents (Offset868:Extent128)
Bit 7 represents (Offset996:Extent128)

It is to be noted the Offset:Extent represented by each bit is implicit, and relative to that of the metadata node, and no storage except for the single bit itself is required. In a worst case situation, for example, if there occurred writes at offsets 228, 484, 740, 996, what potentially could have been new metadata nodes used in prior techniques can be represented by the eight bits in the bitmap example above. Bits 1, 3, 5 and 7 are a "1" value should such a sequence of writes occur after a snapshot has been established.

Figure 9:
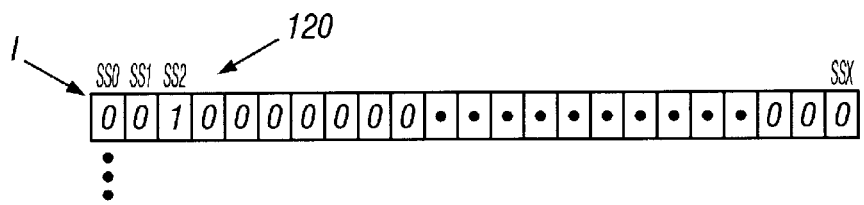
FIG. 9 is a schematic representation of the bitmap of FIG. 6 representing modification of the data node from FIG. 7 to FIG. 8 according to the present invention.

In the topology depicted in FIG. 7, a write operation to source drive at offset 1536 for an extent, for example, of 56 data blocks entails that the subsegment index for that node be modified in the bitmap B for node 100. Node 100 is then modified according to the present invention to the form shown in FIG. 8. Node 100 as modified indicates SSValid=True and the first SSIndex identifier 0 corresponding to the first index in the bitmap B (FIG. 9). In the bitmap B, a bitmap position indicated at 120 corresponding to the offset and extent of the write operation is the third one, as indicated. This signifies that a small extent within the large extent of the node 100 has been copied over to the target drive.

Subsequent write operations to different extents within node 100 do not require formation of new and additional metadata nodes or that an additional index be formed. Rather, the SSIndex already present in the bitmap B is updated. Those portions of the bitmap B corresponding to the offset and extent of a new write operation are assigned a "1" value, and the SSIndex indicator is modified, as well.

The newly assigned "1" value replaces an initial "0," thus now signifying that those segments previously not copied over have now been the subject of a write operation, and thus have changed at the source drive since time $t_0$. Subsequent read operations look to the bitmap B to determine whether the time $t_o$ data is available from the target drive, or should be obtained from the source drive. At the time all $t_0$ data in the range of a node has been copied from the source to the target, all of the bits in an SSIndex indicator have been changed to "1" from "0". This is an indication that the entire extent of the metadata node represented in the bitmap B by that particular SSIndex has been copied over and the bitmap at that SSIndex can be freed. In the topology that metadata node itself can in effect be deleted. The metadata tree is then modified appropriately to represent the new situation. In this manner when there is no need for a metadata node any longer, its associated subsegment table entry in the bitmap B is cleared.

Thus, with the present invention, the bitmap B indicates in conjunction with the process of FIG. 6, in the metadata nodes which of those nodes have data which has been overwritten. This is done without requiring formation of additional metadata nodes for the overwritten data. It is not necessary to form extra metadata nodes to keep track of small changes due to sparse writes to the source drive.

Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A computer implemented method of maintaining usage metadata nodes about data snapshots of data present in data storage in a data processing system, comprising the steps of:
   forming a snapshot of data present in units of memory segments of the data processing system within a metadata tree log having a plurality of usage metadata nodes;
   scanning the usage metadata nodes within the metadata tree log for units of memory segments overlapping with the units of memory segments of the data in the snapshot resulting from the step of forming a snapshot; and
   if overlapping units of memory segments are found during the step of scanning,
      forming an entry in an associated bitmap, said entry corresponding to the usage metadata at locations indicating the memory segments found to overlap during the step of scanning; and
      modifying the metadata node to indicate that the usage metadata therein contains at least one entry at a location corresponding to an entry in said bitmap which identifies the memory segment to overlap.

2. The method of claim 1, wherein each entry in the bitmap of usage of the storage media of the data processing system corresponds to an assigned portion of the volume of the storage capacity of the data processing system.

3. The method of claim 1, wherein the usage metadata includes an index of areas of the storage media of the data processing system concerning which metadata nodes have been formed.

4. The method of claim 1, wherein no overlapping memory segments are formed during the step of scanning, and further including the step of:
   forming a new metadata node in the usage metadata for the snapshot resulting from the step of forming a snapshot.

5. The method of claim 1, wherein the overlapping memory segments located during the step of scanning fully overlap each other in extent.

6. The method of claim 1, wherein the overlapping memory segments located during the step of scanning match each other in extent.

7. The method of claim 1, wherein the overlapping memory segments located during the step of scanning partially overlap each other in extent.

8. A data processing system maintaining usage metadata nodes about data snapshots of data present in data storage in a data processing system comprising:
   a first data storage volume;
   a second data storage volume;
   a processor for performing data write operations between the first and second data storage volumes;
   means for forming a snapshot of data present in units of memory segments of the data storage volumes within a metadata tree log having a plurality of usage metadata nodes;
   means for scanning the usage metadata nodes within the metadata tree log for units of memory segments which overlap with the units of memory segments of the data in the snapshots formed by said means for forming a snapshot;
   means for forming an entry in an associated bitmap, said entry corresponding to locations indicating the memory segments found to overlap by said means for scanning; and
   means for modifying the metadata node indicating overlapping units of memory segments to designate that the usage metadata therein contains at least one entry at a location corresponding to an entry in said bitmap which identifies the memory segment to overlap.

9. The data processing system of claim 8, wherein the usage metadata includes an index of areas of the storage media of the data processing system concerning which metadata nodes have been formed.

10. The data processing system of claim 8, wherein the usage of metadata includes a storage location for an indication of whether the data write operation is to an area of storage media of the data processing system which has been the subject of an earlier data write operation.

11. The data processing system of claim 8, wherein the usage metadata includes a storage location for an indication of the location of storage media location containing an identifier of those portions of storage media of the data processing system which have been the subject of the earlier data write operation.

12. A computer program product for causing a data processing system to maintain usage metadata nodes about data snapshots of data in storage media of the data processing system, the computer program product comprising:
   a computer program storage device;
   computer-readable instructions on the storage device for causing the data processing system to maintain a metadata tree log having a plurality of usage metadata nodes forming data snapshots of data in storage media of the data processing system by performing the steps of:
      forming a snapshot of data in units of memory segments of the data processing system within said metadata tree log;

scanning the usage metadata nodes within the metadata tree log of units of memory segments overlapping with the units of memory segments of the data in the snapshot resulting from the step of forming a snapshot;

if overlapping units of memory segments are found during the step of scanning,
  forming an entry in an associated bitmap, said entry corresponding to the usage metadata at locations indicating the memory segments found to overlap during the step of scanning;

modifying the metadata node to indicate that the usage metadata therein containing at least one entry at a location corresponding to an entry in said bitmap which identifies the memory segment to overlap.

* * * * *